(12) United States Patent
Line et al.

(10) Patent No.: US 9,555,688 B2
(45) Date of Patent: Jan. 31, 2017

(54) THERMA-ZONE VEHICLE SYSTEM

(75) Inventors: Johnathan Andrew Line, Northville, MI (US); Paul Bryan Hoke, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1019 days.

(21) Appl. No.: 13/197,853

(22) Filed: Aug. 4, 2011

(65) Prior Publication Data

US 2013/0032307 A1 Feb. 7, 2013

(51) Int. Cl.
*B60H 1/00* (2006.01)
*F28D 1/06* (2006.01)

(52) U.S. Cl.
CPC ........ *B60H 1/0055* (2013.01); *B60H 1/00207* (2013.01); *B60H 1/00328* (2013.01); *F28D 1/06* (2013.01); *B60H 2001/00221* (2013.01); *B60H 2001/00235* (2013.01)

(58) Field of Classification Search
CPC .................. B60H 1/0055; B60H 2001/00235; B60H 2001/00214
USPC ............ 165/41, 42, 47, 48.1, 49, 53, 55, 56; 296/39.3, 208, 146, 5
See application file for complete search history.

(56) References Cited

U.S. PATENT DOCUMENTS

| | | | | |
|---|---|---|---|---|
| 973,888 A * | 10/1910 | Stillman | ............................ | 52/17 |
| 2,073,023 A * | 3/1937 | Obrecht | ............................ | 165/56 |
| 2,523,923 A * | 9/1950 | Rodert | ............................ | 454/124 |
| 2,717,173 A * | 9/1955 | Rabe | ............................ | 296/208 |
| 2,859,945 A * | 11/1958 | Kleist | ............................ | 165/63 |
| 3,176,116 A * | 3/1965 | Lighter | ................. | E01C 11/265 |
| | | | | 165/49 |
| 3,585,812 A * | 6/1971 | Parker | ............................ | 62/180 |
| 3,719,135 A * | 3/1973 | Breitschwerdt et al. | ..... | 454/158 |
| 4,168,740 A * | 9/1979 | Cairenius | ........................ | 165/49 |
| 4,172,311 A * | 10/1979 | Heyman | .................. | 29/890.033 |
| 4,172,444 A * | 10/1979 | Atkinson | .................... | F24J 2/26 |
| | | | | 126/660 |
| 4,658,599 A * | 4/1987 | Kajiwara | ......................... | 62/239 |
| 4,782,742 A * | 11/1988 | Yott et al. | ...................... | 454/152 |
| 4,783,115 A * | 11/1988 | Galubensky et al. | ........ | 296/208 |
| 4,784,215 A * | 11/1988 | Sing | ............................ | 165/41 |
| 4,807,523 A * | 2/1989 | Radtke et al. | ................ | 454/137 |
| 4,817,707 A * | 4/1989 | Aoyama | ................... | F24D 3/16 |
| | | | | 165/46 |
| 4,830,908 A * | 5/1989 | Nakajima et al. | ............ | 442/222 |
| 4,856,238 A * | 8/1989 | Kesting | ......................... | 52/220.2 |
| 4,941,528 A * | 7/1990 | Herbst | ............................ | 165/56 |
| 4,986,343 A * | 1/1991 | Sing | ............................ | 165/41 |
| 5,251,689 A * | 10/1993 | Hakim-Elahi | .................. | 165/46 |
| 5,743,327 A * | 4/1998 | Villa | ............................ | 165/55 |
| 5,879,491 A * | 3/1999 | Kobayashi | ..................... | 156/71 |
| 5,950,710 A * | 9/1999 | Liu | ............................ | 165/41 |
| 6,035,654 A * | 3/2000 | Rothe | ........................ | 62/259.1 |
| 6,283,382 B1 * | 9/2001 | Fitzemeyer | ..................... | 237/69 |

(Continued)

*Primary Examiner* — Devon Russell
(74) *Attorney, Agent, or Firm* — Vichit Chea; Price Heneveld LLP

(57) ABSTRACT

A temperature adjustment system for a vehicle including a closed network of interconnected fluid pathways disposed in at least one of a headliner, a door, and an instrument panel of the vehicle. A fluid is disposed in the closed network. A fluid pump pushes the fluid through the closed network. The closed network is not open to an interior cabin of the vehicle and thermodynamically influences a cabin temperature of the vehicle.

7 Claims, 3 Drawing Sheets

(56) References Cited

U.S. PATENT DOCUMENTS

| | | | |
|---|---|---|---|
| 6,964,294 B2* | 11/2005 | Hendricks et al. | 165/41 |
| 6,988,765 B2* | 1/2006 | Nagayama et al. | 296/211 |
| 7,159,651 B2* | 1/2007 | Ito et al. | 165/202 |
| 7,267,386 B2* | 9/2007 | Hesch | 296/39.3 |
| 7,530,386 B2* | 5/2009 | Nagayama et al. | 165/41 |
| 7,618,079 B2* | 11/2009 | Rawat | 296/97.7 |
| 7,832,159 B1* | 11/2010 | Kayhart | 52/220.3 |
| 2009/0139973 A1* | 6/2009 | Hung | 219/202 |
| 2009/0205803 A1* | 8/2009 | Ward et al. | 165/48.1 |
| 2009/0205891 A1* | 8/2009 | Parrett et al. | 180/68.1 |
| 2010/0198414 A1* | 8/2010 | Kroll et al. | 700/278 |
| 2010/0303660 A1* | 12/2010 | Konishi et al. | 418/31 |

\* cited by examiner

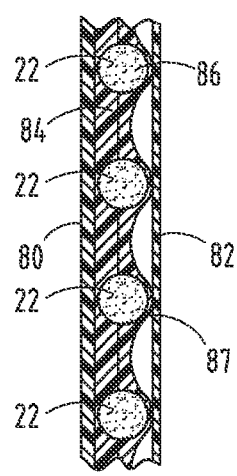
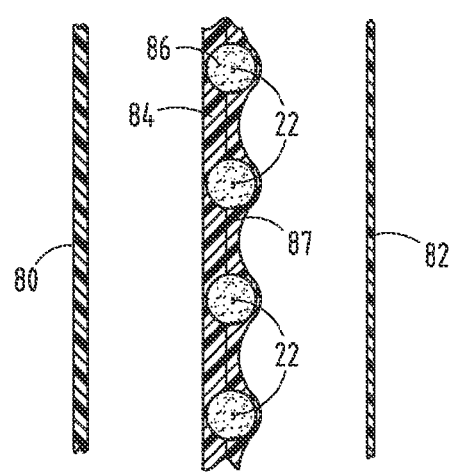
FIG. 3    FIG. 3A
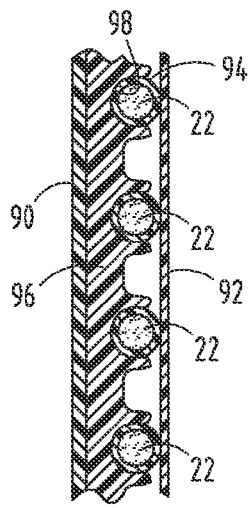
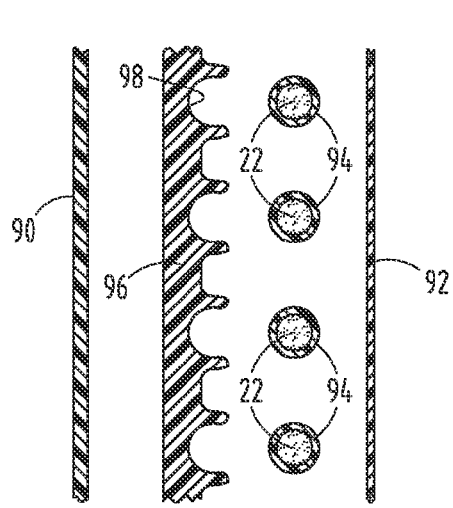
FIG. 4    FIG. 4A
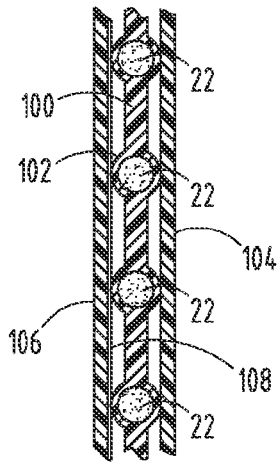
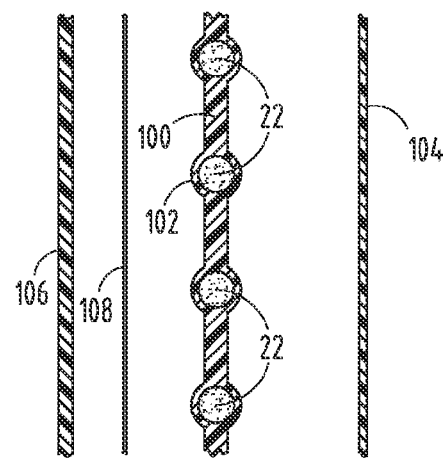
FIG. 5    FIG. 5A

THERMA-ZONE VEHICLE SYSTEM

FIELD OF THE INVENTION

The present invention generally relates to a radiant temperature system for a vehicle, and more specifically to a closed radiant heating and cooling system for use in providing a comfortable environment to vehicle occupants.

BACKGROUND OF THE PRESENT INVENTION

Heating and cooling systems are generally used to provide a comfortable environment inside a vehicle.

SUMMARY OF THE PRESENT INVENTION

One aspect of the present invention includes a temperature adjustment system for a vehicle including a closed network of interconnected fluid pathways disposed in at least one of a headliner, a door, and an instrument panel of the vehicle. A fluid is disposed in the closed network. A fluid pump pushes the fluid through the closed network. The closed network is not open to an interior cabin of the vehicle and thermodynamically influences a cabin temperature of the vehicle.

Another aspect of the present invention includes a temperature adjustment system for a vehicle including a network of interconnected pathways disposed between an exterior wall and an interior wall of the vehicle. A thermodynamically conductive layer is disposed between an interior cabin of the vehicle and the network of interconnected pathways. A thermodynamically insulative layer is disposed between an exterior panel of the cabin and the network of interconnected pathways. A pump pushes a fluid through the network of interconnected pathways to thermodynamically influence a cabin temperature of the vehicle.

Another aspect of the present invention includes a temperature adjustment system for a vehicle including a closed network of interconnected pathways disposed between an exterior wall and an interior wall of a vehicle. A thermodynamically conductive layer is disposed between an interior cabin of the vehicle and the closed network of interconnected pathways. A pump pushes a liquid fluid through the closed network of interconnected pathways to thermodynamically influence a cabin temperature of the vehicle. Heat gained from the interior of the cabin is expelled outside the vehicle.

Yet another aspect of the present invention includes a radiant temperature system for use in a vehicle that includes a lattice of interconnected pathways disposed in one or more various members of a vehicle, such as, for example, the seats, seat surfaces, seat features, seat armrests, door armrests, steering wheel, dash, instrument panel, floor, and headliner. A fluid, such as a liquid or gas having thermodynamically desirable properties, is pumped through the interconnected pathways to raise or lower the cabin temperature of the vehicle. Accordingly, the internal temperature of the cabin of the vehicle is adjusted based on the heat gain or heat loss transferred from the one or more various members to the fluid flowing through the interconnected pathways.

These and other aspects, objects, and features of the present invention will be understood and appreciated by those skilled in the art upon studying the following specification, claims, and appended drawings.

BRIEF DESCRIPTION OF THE DRAWINGS

FIG. 3 is a schematic view of the flow of fluid through the interconnected fluid pathways of the vehicle of the present invention;

FIG. 3A is an exploded view of FIG. 3;

FIG. 4 is a schematic view of a plurality of tubes of the interconnected fluid pathways of the vehicle of the present invention;

FIG. 4A is an exploded view of FIG. 4;

FIG. 5 is a schematic view of a matrix of connecting lines of the interconnected fluid pathways of the vehicle of the present invention; and FIG. 5A is an exploded view of FIG. 5.

DETAILED DESCRIPTION OF EMBODIMENTS

Figure 1:
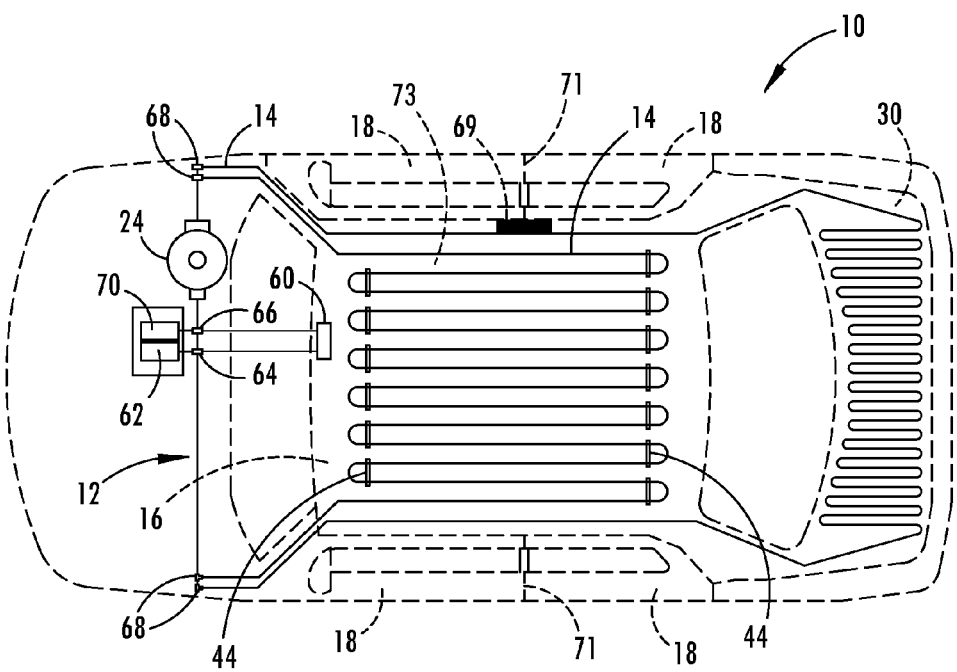
FIG. 1 is a top elevational view of a vehicle of the present invention illustrating a closed network of interconnected fluid pathways.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-5A, the reference numeral 10 generally designates a vehicle including a closed network 12 of interconnected fluid pathways 14 disposed in at least one of a headliner 16, a door 18, and an instrument panel 20 of the vehicle 10. A fluid 22 is disposed in the closed network 12. A fluid pump 24 pushes the fluid 22 through the closed network 12. The closed network 12 is not open to an interior cabin 26 of the vehicle 10, but thermodynamically influences a cabin temperature of the vehicle 10.

Figure 1A:
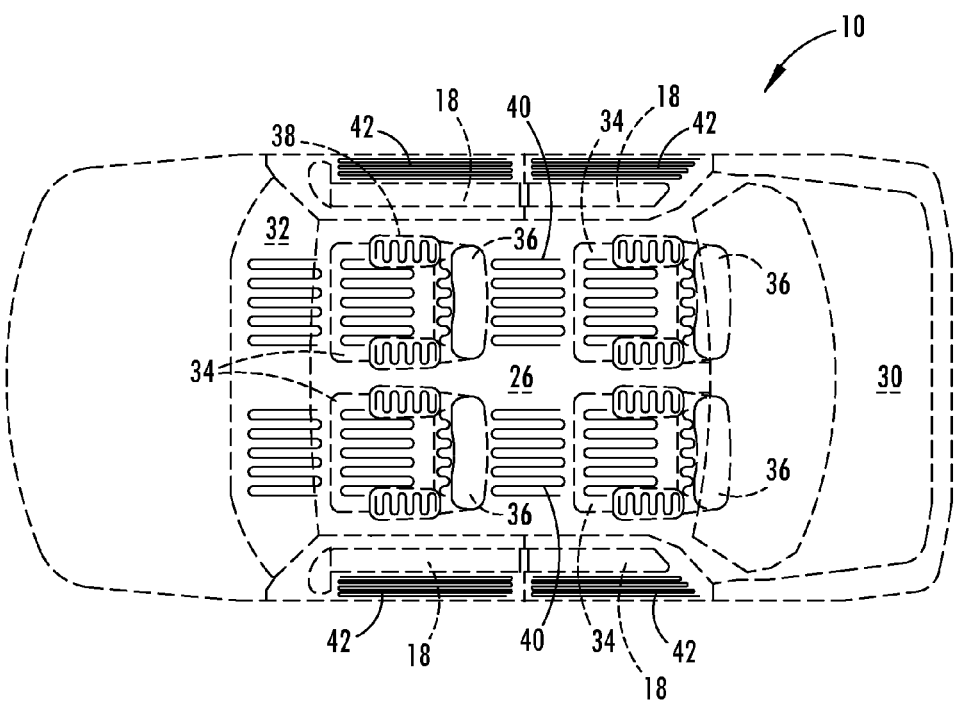
FIG. 1A is another top elevational view of the vehicle of FIG. 1 illustrating the closed network of interconnected fluid pathways in a dash and an instrument panel.

Referring now to FIGS. 1 and 1A, the closed network 12 of interconnected fluid pathways 14 is generally designed to extend through any of a variety of structures including panels or supports throughout the vehicle 10, such as, but not limited to, the headliner, seats, seat backs, floors, door panels, trunk, dash, etc. For example, as shown in FIG. 1, the closed network 12 of interconnected fluid pathways 14 extends through the headliner 16 and a trunk 30 of the vehicle 10. As illustrated in another example illustrated in FIG. 1A, the closed network 12 of interconnected fluid pathways 14 is disposed in a dash 32 adjacent the instrument panel 20 of the vehicle 10, as well as a seat 34, a seat back 36, a seat armrest 38, a floor 40, and door panels 42 of the vehicle 10. The connected fluid 14 may be secured to the headliner 16, the door panels 42, and the instrument panel 20 via retaining members 44, which may be in the form of fastening items, such as retaining clips.

Figure 2:
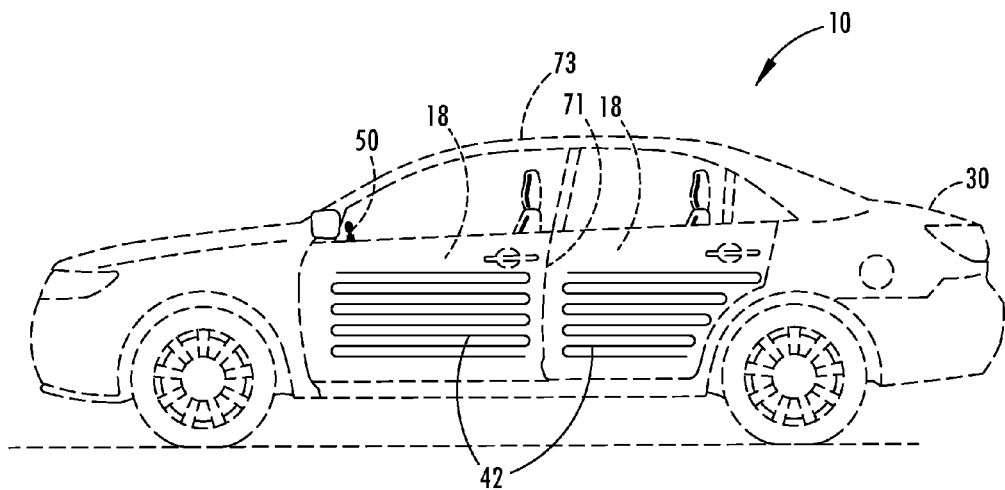
FIG. 2 is a side elevational view of the vehicle of the present invention illustrating the closed network of interconnected fluid pathways in the steering wheel, seating assemblies, and door panels of the vehicle.

Referring now to the embodiment illustrated in FIG. 2, the closed network 12 of the interconnected fluid pathways 14 may also extend through a steering wheel 50, as well as a headrest 52 or a door armrest 54. Although the closed network 12 is shown as extending through various panels and supports of the vehicle 10, it will be understood by one having ordinary skill in the art that the closed network 12 may be positioned in virtually any portion of the vehicle 10, as decided by a manufacturer or requested by an end user.

Referring again to FIGS. 1-2, the closed network 12 of interconnected fluid pathways 14 is connected with the pump 24 that pushes the fluid 22 in the interconnected fluid pathways 14 through either the headliner 16, the trunk 30, or both. The pump 24 may be any of a variety of pumps, such as a rotary pump, screw pump, piston pump, diaphragm pump, gear pump, hydraulic pump, etc. Regardless of construction of the pump 24, the pump 24 is designed to circulate the fluid 22 through the network of interconnected fluid pathways 14 to heat or cool the interior cabin 26 until a desired temperature has been attained.

A control system 60, which includes buttons or switches that can be activated by a user, is disposed in the interior cabin 26 of the vehicle 10. In the event a user desires that the interior cabin 26 of the vehicle 10 be cooled, the user adjusts a switch on the control system 60 to a cooling position. Upon activation of the switch, a cooling system 62 is activated. At the same time, a cool fluid valve 64 connected between the cooling system 62 and the interconnected fluid pathways 14 opens and a hot fluid valve 66 closes. The pump 24 is also activated and begins pushing cool fluid through the cooling system 62, which begins cooling the fluid that flows through the cooling system 62. The cooled fluid 22, which may be a liquid, such as water, oil, or the like, or, alternatively, a gas, such as air, nitrogen, or the like, is pushed through the interconnected fluid pathways 14 by the pump 24. As the cooled fluid 22 flows through the interconnected fluid pathways 14, the surrounding structure, in this case, the headliner 16 and the trunk 30, are cooled. As the headliner 16 and the trunk 30 become cooled, the air in the vehicle 10 proximate the headliner 16 and the truck 30 also begins to cool, thus adjusting the temperature of the interior cabin 26 of the vehicle 10 downward. At the same time the interconnected fluid pathways 14 cool the interior cabin 26 of the vehicle 10 by cooling the headliner 16 and the trunk 30, the interconnected fluid pathways 14 are warmed by the heat transferred from the headliner 16 and the trunk 30 to the interconnected fluid pathways 14. As the warm fluid recirculates back to the pump 24, the pump 24 again pushes the warmed fluid through the cooling system 62, which cools the fluid 22 and then releases the cooled fluid 22 back to the interconnected fluid pathways 14 to be circulated once again through the headliner 16 and trunk 30 of the vehicle 10. Notably, check valves 68 are disposed on the interconnected fluid pathways 14 proximate the various panels and supports. Consequently, a user can operate the cooling system 62 so that only the headliner 16 is cooled, only the trunk 30 is cooled, or both are cooled.

Still referring to FIGS. 1-2, the vehicle 10 may incorporate a waste heat exhaust portion 69 which operates to expel heat gained from the interior cabin 26 outside of the vehicle 10. The waste heat exhaust portion 69 is disposed in a vehicle cabin roof zone 73 proximate a door jamb 71 of the vehicle 10.

Referring again to FIGS. 1-2, the same system may be used to warm the interior cabin 26 of the vehicle 10. In this instance, a user adjusts a switch on the control system 60 to a heating position, thereby activating a heating system 70 that is operably connected with the interconnected fluid pathways 14. When the heating system 70 is activated, the hot fluid valve 66 opens and the cool fluid valve 64 closes. When the hot fluid valve 66 opens, the pump 24 pushes fluid through the heating system 70 and through the interconnected fluid pathways 14 in the headliner 16 and/or the trunk 30 to warm the area adjacent to the closed network 12.

Figure 2A:
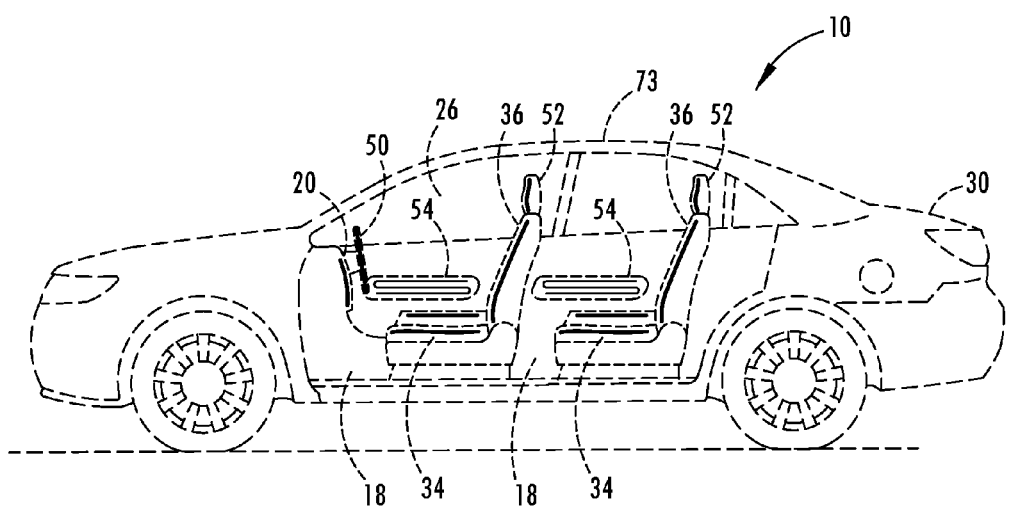
FIG. 2A is another side elevational view of the vehicle of FIG. 2 illustrating the closed network of interconnected fluid pathways in the instrument panel, the steering wheel, and the armrest of the vehicle.

Referring again to FIG. 1A, the same system may be employed to warm the floor 40, the seat 34, the seat back 36, and the seat armrest 38 of the vehicle 10, as well as the door panels 42 of the vehicle 10. It will be understood that any combination of closed network systems may be used that cool various parts of the vehicle 10 and that the illustrated embodiments are meant to serve as examples and not be limiting. The closed network 12 has the effect of eliminating fans and traditional blowing systems that cool a user, and instead relies on thermodynamic convention to cool panels in the vehicle 10, thereby cooling or heating the vehicle 10, interior cabin 26, and/or the trunk 30 of the vehicle 10. Alternatively, as shown in FIGS. 2 and 2A, the steering wheel 50 may also include the closed network 12 of the interconnected fluid pathways 14 such that the steering wheel 50 may be heated or cooled based on the desired preference of a user.

Referring now to FIGS. 3-5A, the closed network 12 can be constructed in a variety of ways. As shown in FIGS. 3 and 3A, in one embodiment of the present invention, an exterior panel 80 and an interior panel 82 are provided. An insulative material 84 is disposed between the exterior panel 80 and the interior panel 82. The insulative material 84 includes long tube-like apertures 86 that define the closed network 12 of the interconnected fluid pathways 14. Accordingly, separate tubing is not required. Notably, the insulative material 84 is substantially thin adjacent to the interior panel 82 such that the thermodynamic interface between the interior cabin 26 of the vehicle 10, or the desired area that is to be warmed or cooled, may be easily influenced by the interconnected fluid pathways 14. Conversely, the insulative material 84 adjacent to the exterior panel 80 is thick such that the exterior panel 80 is influenced very little or not at all by the fluid 22 that flows through the tuber-like apertures 86 that define the interconnected fluid pathways 14. The insulative material 84 can surround the tube-like apertures 86. However, it is also contemplated that the tube-like apertures 86 may be formed between the insulative material 84 and a thermodynamically conductive material 87. This construction maximizes the potential of the interconnected fluid pathways 14 to thermodynamically influence the interior cabin 26 of the vehicle 10 rather than the environment surrounding the vehicle 10. The exterior panel 80 may be connected to the insulative material 84 by adhesive, fasteners, etc. Voids 88 between each tube-like aperture 86 assist in transferring heat to the interior cabin 26 during heating or pulling heat from the interior cabin 26 during cooling.

Referring now to FIGS. 4 and 4A, another embodiment of the present invention includes an exterior panel 90 and an interior panel 92 with a plurality of tubes 94 extending therebetween. An insulative material 96 is disposed between the plurality of tubes 94 and the exterior panel 90 to insulate the exterior panel 90 from the plurality of tubes 94. The plurality of tubes 94 generally define the interconnected fluid pathways 14. The insulative material 96 includes receiving slots 98 that secure the plurality of tubes 94 in place between the interior panel 92 and the exterior panel 94. There may be no or little insulative material 96 between the plurality of tubes 94 and the interior panel 92 such that this construction can readily influence the temperature of the interior cabin 26 of the vehicle 10, depending on whether warm fluid or cool fluid is passing through the interconnected fluid pathways 14.

Referring now to the embodiment illustrated in FIGS. 5 and 5A, the closed network 12 of the interconnected fluid pathways 14 may be connected by a web or lattice 100 of connecting lines 102 disposed between an exterior panel 104 and an interior panel 106. The connecting lines 102 generally define the interconnected fluid pathways 14 and have the effect of properly spacing the interconnected fluid pathways 14 such that consistent and even heating or cooling can be achieved in the interior cabin 26 of the vehicle 10. As with previous embodiments, an insulative layer 108 is positioned between an exterior panel 104 and the interconnected fluid pathways 14 such that the interconnected fluid pathways 14 do not influence the external temperature of the vehicle 10, or only minimally influence the exterior temperature of the vehicle 10. As shown in FIGS. 5 and 5A, the insulative material 108 is a reflective metallic film that shields the tubes, which define the interconnected fluid pathways 14 from the exterior panel 104. Consequently, the interconnected fluid pathways 14 have the effect of influencing the temperature of the interior cabin 26 of the vehicle 10 rather than the exterior area of the vehicle 10.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A temperature adjustment system for a vehicle comprising:
   a closed network of pathways interconnected by a valve and disposed between exterior and interior walls of the vehicle;
   a thermodynamically conductive layer disposed between and separating the interior walls of the vehicle from the pathways; and
   air voids defined between conductive layer undulations and the interior wall, wherein the pathways are defined partially by an insulative layer and partially by the conductive layer.

2. The temperature adjustment system for a vehicle of claim 1, further comprising:
   an insulative material disposed around the liquid fluid pump.

3. The temperature adjustment system for a vehicle of claim 1, wherein the closed network of interconnected pathways are molded into a retaining member adjacent the at least one of the headliner, the door, and the instrument panel of the vehicle.

4. The temperature adjustment system for a vehicle of claim 1, wherein a gaseous fluid is pushed through the closed network.

5. The temperature adjustment system for a vehicle of claim 1, further comprising:
   a waste heat exhaust portion, wherein heat gained from an interior of a cabin is expelled outside the vehicle.

6. The temperature adjustment system for a vehicle of claim 5, wherein the waste heat exhaust portion is disposed proximate a door jamb of the vehicle.

7. The temperature adjustment system for a vehicle of claim 6, wherein the waste heat exhaust portion is disposed in a vehicle cabin roof zone.

* * * * *